March 12, 1957 C. A. GULBRANDSEN 2,785,228

PARTY LINE IDENTIFICATION AND CHECKING CIRCUIT

Filed June 6, 1955 5 Sheets-Sheet 1

INVENTOR.
Christian A. Gulbrandsen
BY Smith, Olsen, Baird & Miller.
Attys.

March 12, 1957 C. A. GULBRANDSEN 2,785,228

PARTY LINE IDENTIFICATION AND CHECKING CIRCUIT

Filed June 6, 1955 5 Sheets-Sheet 2

INVENTOR.
Christian A. Gulbrandsen
BY Smith, Olsen, Baird & Miller.
Attys.

CALL RECORDER 2000X

INVENTOR.
Christian A. Gulbrandsen
BY Smith Olsen, Baird & Miller.
Attys.

INVENTOR.
Christian A. Gulbrandsen
BY Smith, Olsen, Baird & Miller.
Attys.

INVENTOR.
Christian A. Gulbrandsen
BY Smith, Olsen, Baird & Miller
Attys

United States Patent Office 2,785,228
Patented Mar. 12, 1957

2,785,228

PARTY LINE IDENTIFICATION AND CHECKING CIRCUIT

Christian A. Gulbrandsen, Park Ridge, Ill., assignor to Automatic Electric Laboratories, Inc., Chicago, Ill., a corporation of Delaware Application June 6, 1955, Serial No. 513,229

9 Claims. (Cl. 179—17)

Figure 1:
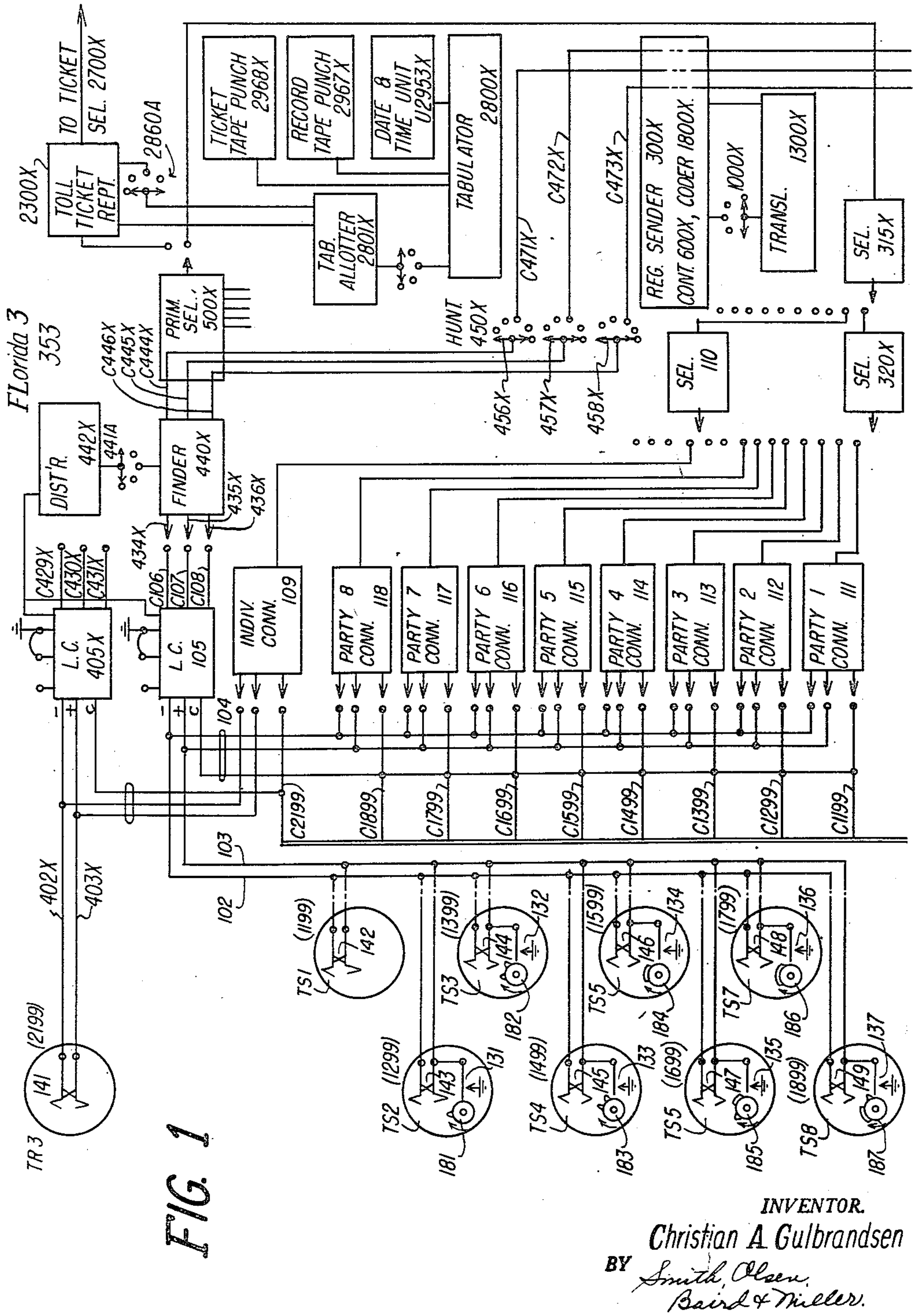

The present invention relates in general to telephone systems and more particularly to improved arrangements for identifying and checking the identification of calling stations on party lines in automatic ticketing systems of the type disclosed in the John E. Ostline Patent No. 2,678,353, granted May 11, 1954.

In the automatic toll ticketing telephone system disclosed in the above mentioned Ostline patent, an idle register sender is associated with a calling line as soon as a call is initiated thereon and the impulses corresponding to the digits of a called subscriber directory number, as dialed over the calling subscriber line, are registered in the register sender. The first three dial digits corresponding to the called office code selectively control a common translator which translates the particular called office code digits into one or more routing digits and registers these routing digits in the register sender. After the translation is completed, the register sender automatically functions to transmit the routing digits and certain of the registered digits of the called subscriber directory number in order to establish a connection with a toll ticket repeater and with the desired called subscriber station.

As soon as the register sender determines that the particular call is to be ticketed, it selectively controls a detector to identify the digits of the directory number of the calling subscriber station.

During the set-up of the connection to the called station and in response to the inclusion of the toll ticket repeater in the connection, the register sender transmits to the toll ticket repeater and registers therein various items of information pertaining to the particular connection including the calling station directory number, the called station directory number, the class of service and the rate.

As soon as the connection is completed between the calling and called stations, the toll ticket repeater starts timing the call and at the time of the release of the connection, the toll ticket repeater has registered therein all of the above mentioned items of information including the total elapsed time of the conversation of the particular call. Thereafter, the toll ticket repeater transfers all of the registered information to a tabulator mechanism and the tabulator mechanism in turn controls a record tape punch mechanism and a ticket tape punch mechanism to produce two separate perforated tapes containing certain of the above noted items of information. These tapes may then be utilized to control appropriate business machines to produce printed records of the items of information.

The above system is also arranged to handle different classes of subscriber lines, including private lines and four party lines. Each of the substations connected to the various lines of the system is provided with a calling device to enable the subscriber thereat to transmit impulses corresponding to the digits of any called subscriber directory number. For this purpose, each of the calling devices at the private station and the first station on each party line is of conventional construction and arrangement and each of the calling devices at the second, third and fourth stations on each party line is of the construction and arrangement of the calling device disclosed in the John E. Ostline Patent No. 2,410,520, granted November 5, 1946.

The special dials at the second, third and fourth stations on the four party lines are arranged to transmit regular loop impulses corresponding to the dialed digits and, in addition, individual station identifying ground impulses. During the transmission of the regular loop impulses, the special dial at the second, third or fourth station on a four party line will also automatically transmit one, two, or three spaced ground impulses which are registered in the register sender to identify the respective second, third or fourth calling station on the four party line. Since the first station on the four party line is provided with a conventional dial arranged to transmit only loop impulses it does not transmit station identifying ground pulses to the register sender. In this manner the register sender is selectively controlled during the dialing of the digits of a called subscriber directory number to register the identity of the particular calling station on any four party line and in accordance with this registration it controls the detector to identify and register the numerical portion of the directory number of the particular calling station.

The foregoing method of registering the identity of a calling station on a four party line and of controlling the detector to identify the directory number of a particular calling station incident to the extension of a call is entirely satisfactory but it does limit the number of stations that may be on the party lines in any particular telephone system.

Specifically, it is noted that in the above described system, the second letter of the code portion of the directory number must be no less than the digit 2 in order to permit identification of all four stations on a party line. Thus, for a five station party line, the second letter of the code portion could be no less than the digit 3 and for an eight station party line, the second letter of the code portion could be no less than the digit 6. Inasmuch as it is the present practice in commercial telephone systems to employ the 7 digit directory number scheme for the identification of subscriber lines wherein the first two digits correspond to the first two letters of the called exchange name, all of the digits from 2 through 9 must be available for dialing the first two letters of the called exchange name. In such a system, the largest practical number of stations on any one party line is four and to employ the use of party lines having a number of stations greater than four, a different type of station identification system such as that disclosed in the Len B. Mitchell Patent No. 2,708,690, granted May 17, 1955, must be used.

The identification system utilized in the Mitchell patent employs at the eight stations on a party line calling devices of a construction and arrangement to transmit regular loop pulses corresponding to the dialed digits and individual station identifying ground pulses of preselected number and duration. Thus, one of the stations may be identified by the absence of ground pulses and an additional three of the stations may be identified respectively by one, two and three ground pulses which may precede, fall between or come after the digit 2 and digit 1 loop pulses. Further, other stations may be identified by a long ground pulse which may overlap 2 loop pulses or 1 loop pulse. Additionally, other stations may be identified by various combinations of short ground pulses spaced between loop pulses and long ground pulses overlapping other loop pulses.

It is important to the proper functioning of the toll ticketing system that the calling stations be correctly identified. A limitation of both of the above described station identification systems is that a calling party at a station on a party line may, by actuation of the receiver switchhook at the time of dialing, falsely charge the call to another station on the party line. Thus, a party station that is normally identified by an absence of ground potential may be falsely charged with a call made at another calling station on the line if the subscriber at the calling station actuates the switchhook springs in accordance with the desired second digit instead of actuating the dialing mechanism. In another example, if all of the party stations must be identified by the transmission of at least one ground pulse, a false identification may also be made by actuating the dial in accordance with the digit 1 (if the digit 2 is the second digit of the called number) and then momentarily actuating the switchhook so that the digit 2 will be registered by the register sender. However, during the transmission of the single pulse, the calling station identifying ground signal will be mutilated and may, in some cases, correspond to the identification of another station on the party line.

Accordingly, the principal object of the present invention is to provide in a telephone system of the type noted an improved arrangement for identifying and checking the identification of a particular calling station on a party line which arrangement requires no special operator and which permits the use of any of the letters corresponding to the digits 2 through 0 in the called office codes.

A further object of the invention is to provide in a telephone system of the type noted an improved circuit arrangement for independently identifying a calling station on a party line a plural number of times and registering a fault when the independent identifications are not the same.

Figure 2:
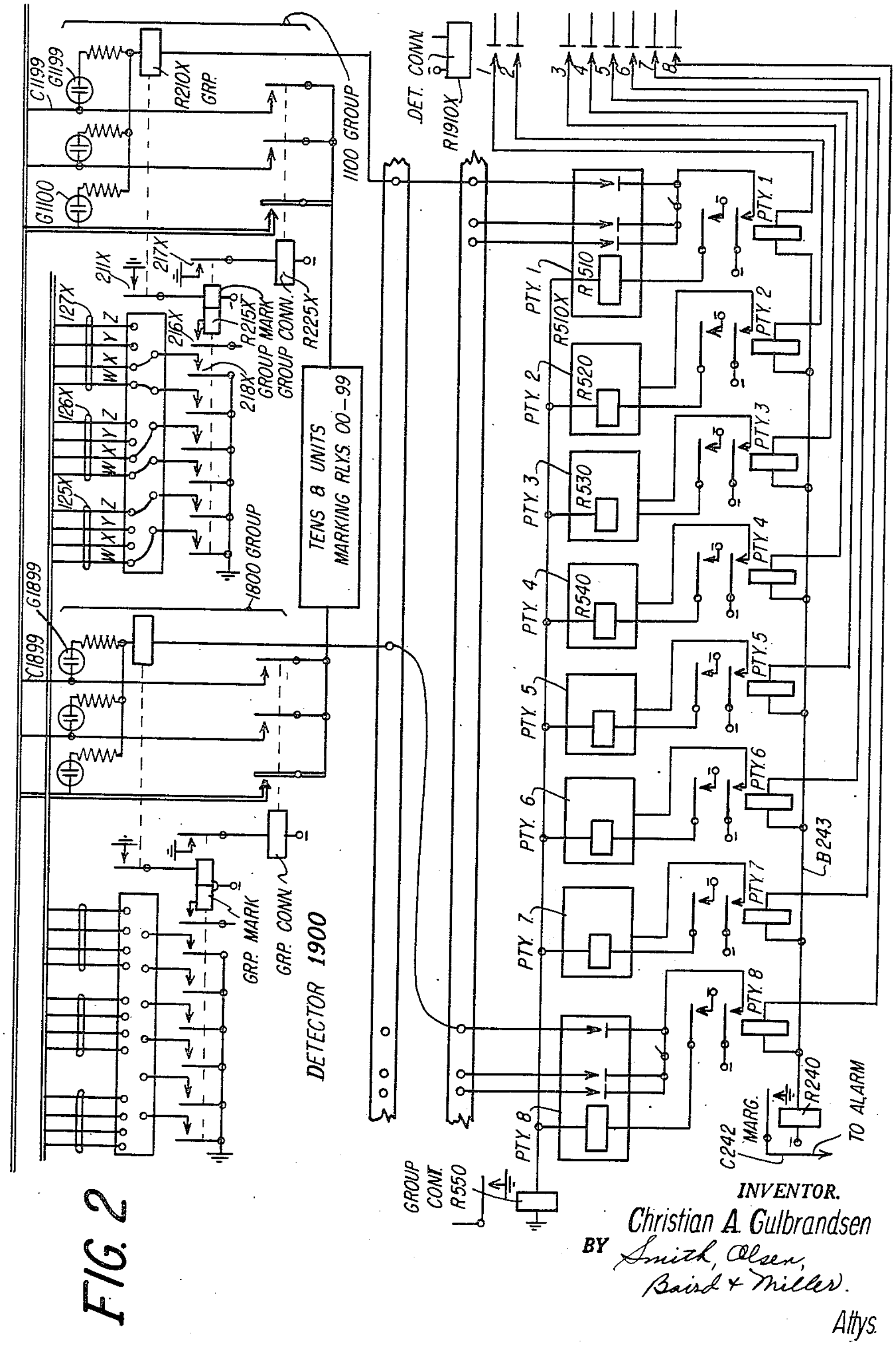
Figure 3:
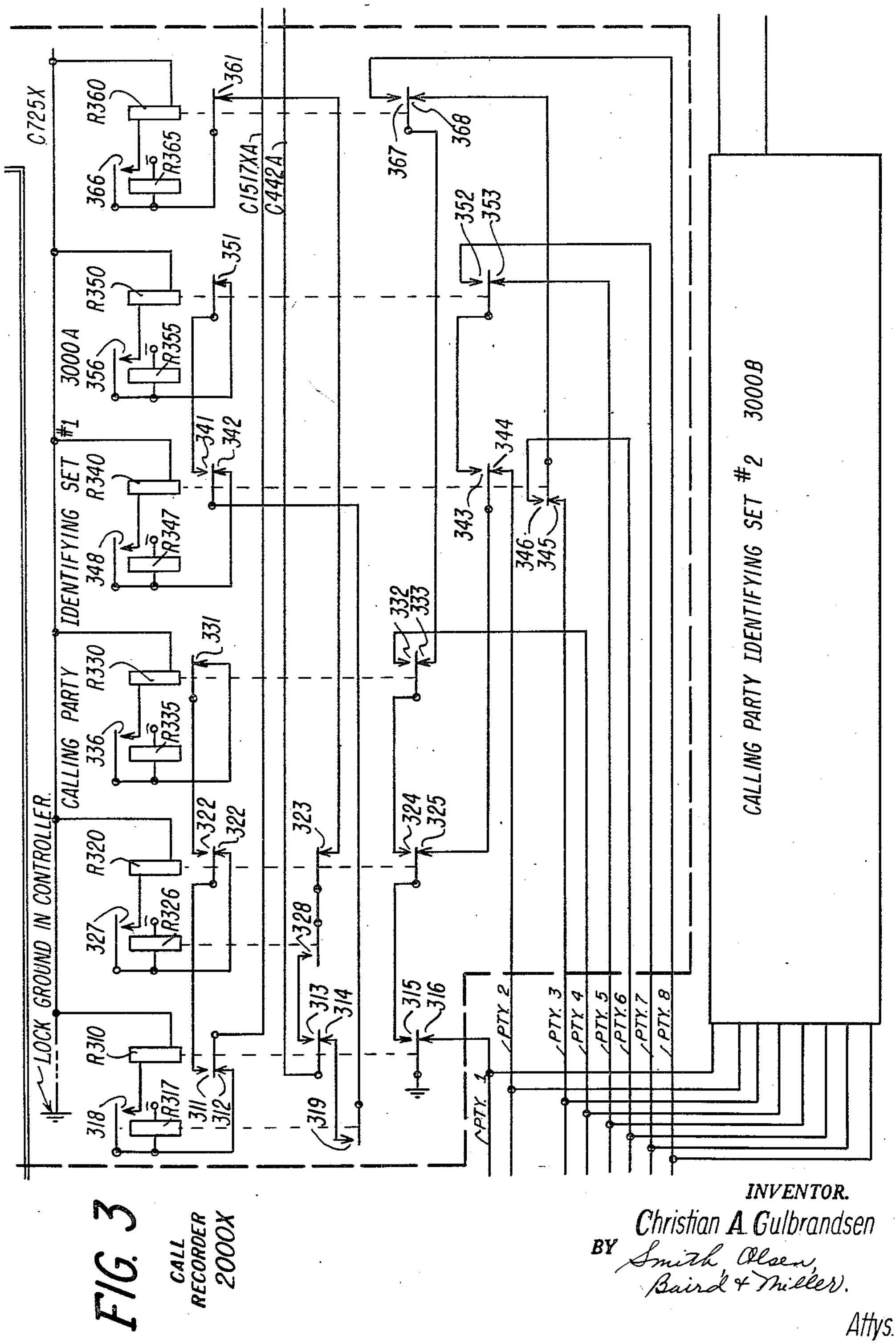
Figure 6:
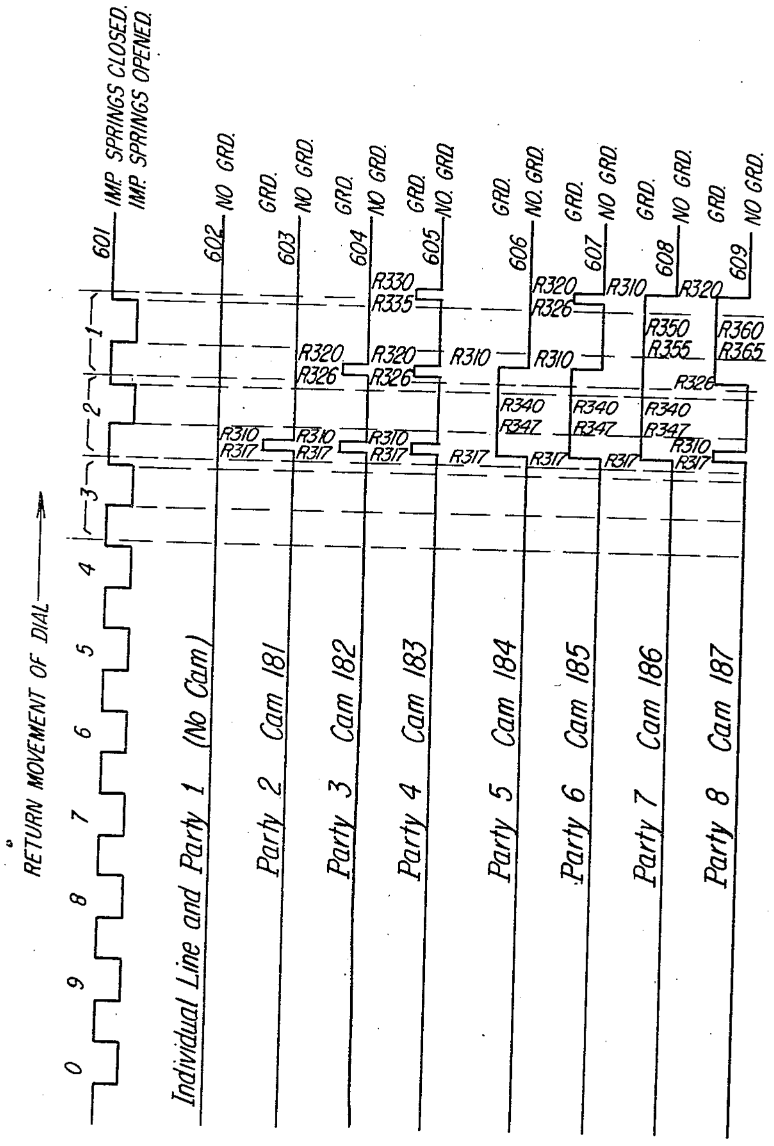

The invention, both as to its organization and method of operation, together with further objects and advantages thereof will best be understood by reference to the following specification and the accompanying drawings in which Figs. 1 to 4, inclusive, illustrate the apparatus incorporated in a toll ticketing telephone system which apparatus has incorporated therein the features of the invention as briefly outlined above; Fig. 5 illustrates the mode of combining Figs. 1 to 4, inclusive, to display the complete system; and Fig. 6 schematically illustrates the order in which the special calling devices at the various subscriber stations on the party line transmit switch controlling impulses corresponding to digits of called subscriber numbers and station identifying ground impulses corresponding to the respective stations on the party line. More particularly, Fig. 1 illustrates schematically a major portion of the apparatus incorporated in the toll ticketing telephone system exchange; Fig. 2 illustrates a portion of the detector provided in the toll ticketing exchange; Fig. 3 illustrates the details of the calling party identifying relays incorporated in the call recorder apparatus included in the register sender of the toll ticketing telephone exchange; and Fig. 4 discloses certain of the details of the call register apparatus and the code switch apparatus included in the register sender of the toll ticketing telephone exchange.

*The general arrangement of the telephone system*

In the disclosure of the previously mentioned Ostline patent, the automatic toll ticketing telephone system serves a large metropolitan area and its adjacent suburban areas which are divided into a number of zones each of which includes one or more exchanges. In that system, the areas served comprise, among other zones, the zone 35 including the FLorida 1, FLorida 2 and FLorida 3 exchanges. Each exchange in each zone comprises a ten thousand terminal unit although the maximum capacity of each exchange need not be initially installed. The subscriber lines terminating at each exchange in each zone include both private subscriber lines and party subscriber lines. In order to provide separate station telephone directory numbers for each of the stations on the party lines, they are terminated in the exchanges on a terminal-per-station basis.

The various exchanges in each zone are interconnected by suitable groups of trunk lines, not shown, and at least one exchange in each zone is connected with one or more of the exchanges in other zones by suitable groups of interconnecting toll lines. In the automatic toll ticketing telephone system the local and toll calls are established by automatic switching apparatus under control of the calling subscriber station equipment including the usual calling device or dial. A universal numbering scheme is utilized whereby all called subscriber stations in the various exchanges in the various zones are dialed as listed in the telephone directory. Accordingly, the directory number of each subscriber station comprises a code portion including three digits, representing respectively the first two letters of the exchange name and the digit representing the number of the particular exchange in the zone, and a numerical portion including four digits identifying the terminal of the particular called subscriber station. Since all of the party lines are arranged on a terminal-per-station basis, each station thereon is provided with an individual four digit number identifying the particular terminal of the station on the party line.

The apparatus disclosed in Figs. 1 to 4, inclusive, represents the exchange apparatus provided in the FLorida 3 exchange as is shown in the previously mentioned Ostline patent. This apparatus, however, has been modified in order to incorporate therein the previously noted features of the present invention and reference may be had to the above mentioned Ostline patent for a more detailed explanation of the circuits which have been shown in block form in order to simplify the disclosure of the present application. In the previously mentioned Ostline patent, however, the detector disclosed schematically therein corresponds to the detector illustrated in detail in Figs. 29 to 38, inclusive, of the Ostline Patent No. 2,586,704, granted February 19, 1952. In the present application, the detector 1900X, schematically illustrated in Fig. 2 of the drawings, is in accordance with the detector illustrated and described in the Ostline Patent No. 2,639,330, granted May 19, 1953 and reference may be had to the last mentioned application for a detailed explanation of the operation of the detector.

*The apparatus incorporated in the FLorida 3 exchange*

Figures 4, 5:
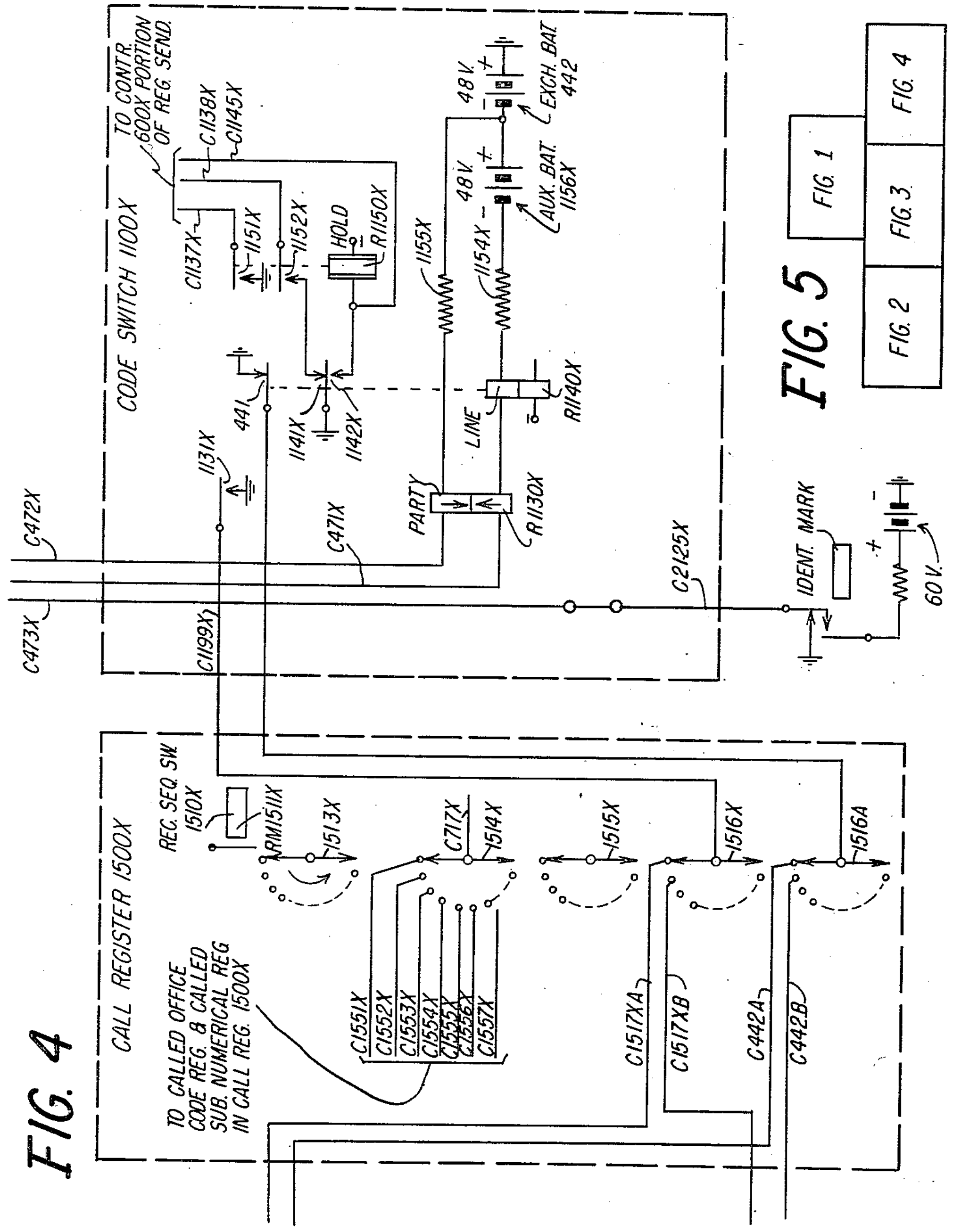

Before proceeding with the description of the switching equipment included in the FLorida 3 exchange, it should be noted that the apparatus illustrated in Figs. 1 to 4, inclusive, is provided with numerical designations identifying such apparatus and that some of these designations are also provided with the suffix "X." In order to facilitate cross referencing of the respective units of equipment with the corresponding equipment shown in the previously mentioned Ostline Patent No. 2,678,353, like units of equipment shown in Figs. 1, 3 and 4 in the present application have been given the same numerical designations as those appearing in the above mentioned Ostline patent but including the suffix "X." Also, in order to cross reference the equipment shown in Fig. 2 of the present application with the corresponding equipment shown in the previously mentioned Ostline Patent No. 2,639,330, like units of equipment in the present application have been given the same numerical designations as those appearing in the last mentioned Ostline patent but including the suffix "X."

The switching equipment included in the FLorida 3 exchange comprises a number of line circuits individually associated with subscriber lines terminating in the exchange. For example, the line circuit 405X terminates the line conductor 402X and 403X of the regular subscriber station TR3 and the line circuit 105 terminates the line conductors 102 and 103 commonly connected to the eight party subscriber stations TS1 to TS8, inclusive.

The switching equipment in the FLorida 3 exchange also comprises a group of finder switches, including the finder switch 440X, which have access to the line circuits 405X and 105 under control of the common distributor 442X and the associated finder switch selector 441X. The finder switch 440X is automatically selected for use in response to a call on any one of the subscriber lines to find and connect with the calling line and thus extend the same to the primary selector 500X individually associated with the finder switch. Each of the primary selectors in the exchange is provided with a register sender hunter, such as the register sender hunter 450X, having access to a group of register senders including the register sender 300X.

Each register sender in the exchange includes a controller 600X portion, a coder 1800X portion, a code switch 1100X portion and a call register 1500X portion. In the present disclosure, the call register 1500X portion and the code switch 1100X portion of the director 300X have been partially disclosed in Fig. 4 of the drawings, in order to show the modifications thereof necessary for a complete understanding of the operation of these circuits in accordance with the present invention.

During the establishment of a connection, the called subscriber directory number is registered in the call register 1500X portion of the register sender and if it is determined that a translation is to be made of the code digits designating a particular called exchange, a translator 1300X, which is common to all of the directors in the exchange, will be connected to the particular calling register sender by means of the translator assigner 1000X. The translator 1300X is provided to translate the called office code digits into one or more routing digits which are registered in the register sender before the translator 1300X is released.

The telephone exchange is also provided with a local switch train including the selectors 110, 320X and 315X, and a plurality of groups of connectors including the individual connector 109 and the party 1 to party 8, connectors 111 to 118, inclusive. The group of individual connecters, including the connector 109, have access over their associated bank contacts to the various individual subscriber stations including the regular subscriber station TR3. The party connectors 111 to 118, inclusive, have access over their associated bank contacts to party lines including the party line connected to the eight subscriber stations TS1 to TS8, inclusive. Each of the party connectors 111 to 118, inclusive, is arranged to transmit a different ringing frequency over the two line conductors of the party line in order to selectively signal any one of the eight party subscriber stations. All of the selectors and connectors, noted above, are of the Strowger type and are of conventional construction and arrangement.

The toll thicketing apparatus provided in the FLorida 3 exchange comprises a plurality of groups of toll ticket repeaters, one of which includes the toll ticket repeater 2300X, a number of tabulators, such as the tabulator 2800X, a ticket tape punch mechanism 2968X, a record tape punch mechanism 2967X and a date and time unit U2953X. In order to associate an idle one of the tabulators with a calling one of the toll ticket repeaters, there is also provided a tubulator allotter 2801X and a ticket repeater finder 2860X. It may be well to mention at this time that the toll ticket repeaters are individually connected to ticket repeater selectors in order to select toll trunks extending to other exchanges in the telephone system whenever a call, which is to be ticketed, is originated by a subscriber in the FLorida 3 exchange.

The telephone exchange is also privided with a call recorder, such as call recorder 2000X, individually associated with each register sender in the exchange. The call recorder 2000X schematically shown in Fig. 3 includes two sets of calling party identifying relays 3000A and 3000B, respectively, with circuitry for rendering a plural registration of the identification of any one of eight stations on an eight-party line and also the identification of any individual line station.

The detector 1900X schematically illustrated in Fig. 2 is the same as detector 1900 shown in the previously mentioned Ostline Patent No. 2,639,330, granted May 19, 1953, except that it has been modified to show eight party relays, instead of four, for controlling the detector to detect the four digit numerical portion of the directory number of any one of the eight stations on any eight-party line. Further, the detector has been modified to include a marginal type alarm relay R240 which is connected in series with each of the eight-party relays and is operated upon the operation of two or more party relays.

Referring now to Fig. 1, it is noted that each subscriber station is provided with a calling device or dial and it should be understood that each station is also provided with the usual station apparatus (not shown) including a a telephone instrument and ringer. The calling device provided at the regular subscriber station TR3 and at the first party subscriber station TS1 on the party line is of conventional construction and arrangement wherein the impulsing springs, such as the springs 141 and 142, interrupt a circuit including the associated line conductors during the return movement of the dial to its normal position. The number of interruptions of the impulsing springs, during the return movement of the dial, is determined in accordance with the extent of the forward movement of the dial to the finger stop. The calling devices, provided at the second to eighth subscriber stations TS2 to TS8, inclusive, are of special construction and arrangement as previously noted. The special dials, in addition to the usual impulsing springs 143 to 149 inclusive, are provided with cams 181 to 187, inclusive, and associated contacts 131 to 137, inclusive, which are utilized to identify the position of the associated subscriber stations on the associated party line.

Referring now to Fig. 6, it will be seen that the impulsing springs at the various subscriber stations are arranged to interrupt the circuit including the line conductors 102 and 103, as is graphically illustrated by the line 601 and that the station identifying cams at the different stations on the party line are arranged to apply ground potential to the line conductors as is graphically illustrated by the lines 602 to 609, inclusive. Fig. 6 also shows the sequence in which the calling party identifying relays of Fig. 3 are operated in response to the different station identifying ground impulses. In accordance with conventional practice, the line 601 represents the action of the dial impulsing springs, during the return movement of the dial to normal, to transmit one or more switch controlling impulses over the conductors of the subscriber line in accordance with the digits dialed. The lines 603 to 609, inclusive, illustrate the manner in which each of the cams 181 to 187 at the party subscriber stations apply station identifying ground impulses to the line conductors during the return movement of the dial. More specifically, the line 602 illustrates the fact that the regular subscriber dials and the dials at the first party subscriber station on each party line do not transmit station identifying ground impulses. The line 603 represents the action of the cam 181 to control the associated contacts 131 during the return movement of the dial at the second party subscriber station TS2. Accordingly, it will be seen that just prior to the transmission of the next to the last switch controlling impulse by the impulsing springs 143, a single short ground impulse is transmitted during the time the impulsing springs 143 are closed. The line 604 illustrates the action of the cam 182 and the associated contacts 132 during the return movement of the dial at the third party subscriber station TS3 to transmit one short ground impulse just prior to the transmission of the next to the last switch controlling impulse and to transmit an additional short ground impulse between the transmission of the next to the last and the last switch controlling impulse by the impulsing springs 144. The line 605 illustrates the action of the cam 183 and the associated contacts 133 to transmit three short ground impulses over the line conductor 103 during the return movement of the dial at the fourth party subscriber station TS4. At this station, the first short ground impulse is transmitted just prior to the transmission of the next to the last switch controlling impulse, the second ground impulse is transmitted between the transmission of the next to the last and the last switch controlling impulses and the third ground impulse is transmitted after the transmission of the last switch controlling impulse by the impulsing springs 145. The line 606 illustrates the action of the cam 184 and the associated contacts 134 during the return movement of the dial at the fifth party subscriber station TS5 to transmit one long ground impulse. It will be seen that the cam 184 closes the associated contacts 134 to apply ground potential to the line conductors just prior to the transmission of the next to the last switch controlling impulse by the impulsing springs 146 and that it retains the ground potential thereon until after the transmission of the next to the last switch controlling impulse. With this arrangement, a long ground impulse is retained on the line conductor 103 during the time that a switch controlling impulse is transmitted over the line conductor 102. The line 607 illustrates the action of the cam 185 and the associated contacts 135 during the return movement of the dial at the sixth party subscriber station TS6 to transmit one long ground impulse followed by a short ground impulse. It will be seen that the cam 185 closes the associated contacts 135 to apply ground potential to the line conductors 102 and 103 just prior to the transmission of the next to the last switch controlling impulse by the impulsing springs 147 and that the ground potential is retained on the line conductor 103 until after the transmission of the next to the last switch controlling impulse. After the transmission of the last switch controlling impulse, the cam 185 closes the associated contacts 135 to transmit an additional short ground impulse over the line conductors. The line 608 illustrates the action of the cam 186 and the associated contacts 136 during the return movement of the dial at the seventh party subscriber station TS7 to transmit an extra long ground impulse. It will be seen that the cam 186 closes the associated contacts 136 to apply ground potential to the line conductors just prior to the transmission of the next to the last switch controlling impulse by the impulsing springs 148 and that the ground potential is retained on the line conductor 103 until after the transmission of the last switch controlling impulse.

Finally, the line 609 illustrates the action of the cam 187 and the associated contacts 137 during the return movement of the dial at the eighth party subscriber station TS8 to transmit one short ground impulse followed by a long ground impulse. It will be seen that the cam 187 closes the associated contacts 137 to transmit a short ground impulse just prior to the transmission of the next to the last switch controlling impulse by the impulsing springs 149, that it applies ground potential to the line conductors 102 and 103 just prior to the transmission of the last switch controlling impulse and that it retains the ground potential on the line conductor 103 until after the transmission of the last switch controlling impulse.

*Identifying station TS1*

In order to describe the operation of the telephone system on the eight-party line, it will first be assumed that a metropolitan toll call is initiated by the first party subscriber station TS1 whose connector bank terminal number is 1199. In response to the removal of the receiver from the associated switchhook at station TS1, a loop circuit including the impulsing springs 142 and line conductors 102 and 103 is completed for operating the line circuit 105 individually associated with the eight-party line. The line circuit 105 operates in the well-known manner to cause the distributor 442X and the finder selector 441X to find and select an idle finder switch, such as the finder switch 440X. The selected finder switch operates in the well-known manner to find the terminals connected to the line circuit 105 individual to the calling subscriber line. Accordingly, it will be assumed that the finder switch 440X operates its wipers 434X to 436X, inclusive, in a vertical and then in a rotary direction to engage the terminals connected to the conductors C106 to C108, inclusive, individual to the line circuit 105. In response to the foregoing operation, the primary selector 500X causes the register sender hunter 450X to associate an idle register sender, such as the register sender 300X, with the calling subscriber line.

As previously noted, the register sender 300X includes a controller 600X portion, a coder 1800X portion, a code switch 1100X portion and a call register 1500X portion. Since the controller 600X and the coder 1800X portions of the register sender do not require any modifications to illustrate the present invention, the details thereof have not been shown. However, the various modifications required in the call register 1500X and the code switch 1100X portions of the register sender have been illustrated in Fig. 4 to show the manner in which they cooperate to register the identity of any calling subscriber station incident to the setting up of a connection.

Accordingly, when the register sender 300X is associated with the primary selector 500X by the register sender hunter 450X, a loop circuit including the calling subscriber party line is completed for operating the line relay R1140X in the code switch 1100X. This loop circuit may be traced from the junction between the positive terminal of the auxiliary battery 1156X and the negative terminal of the exchange battery 442, the resistor 1155X, the upper winding of the party relay R1130X, the conductor C472X, the wiper 457X of the register sender hunter 450X, the conductor C505X, the primary selector 500X, the conductor C445X, the finder 440X, the wiper 435X, the conductor C107, the line circuit 105, the line conductor 103, the calling subscriber station TS1 including the impulsing springs 142, the line conductor 102, the line circuit 105, the conductor C106, the wiper 434X, the finder 440X, the conductor C444X, the primary selector 500X, the conductor C504X, the wiper 456X of the register sender hunter 450X, the conductor C471X, the lower winding of the party relay R1130X, the upper winding of the line relay R1140X, and the resistor 1154X to the negative terminal of the auxiliary battery 1156X. The line relay R1140X operates over the above traced loop circuit but the party relay R1130X does not operate at this time due to the fact that the windings of the relay are differentially wound and oppose each other. As soon as the line relay R1140X operates, it completes, at its contacts 1142X, an obvious circuit for operating the hold relay R1150X and it applies ground potential to the conductor C1145X extending to the controller 600X portion of the register sender in order to initiate operation thereof to perform a class test of the calling subscriber line and to also control the transmission of a dial tone signal over the calling party line.

When the calling subscriber at station TS1 hears the dial tone signal, the dial thereat may be actuated in accordance with the first two letters of the desired called exchange, the numerical digit designating the particular called exchange and the four digits constituting the numerical portion of the called subscriber directory number. In accordance with conventional practice, the first two letters of any called exchange may correspond to any of the digits 2 to 9, inclusive. Accordingly, if the first letter of the called exchange is the letter A, B or C, the calling subscriber in response to actuation of the dialing mechanism will transmit two switch controlling impulses over the above described circuit to the line relay R1140X by momentarily interrupting the impulsing springs 142 two times. During the return movement of the dial, the switch controlling impulses will control the line relay R1140X to restore and reoperate two times in accordance with conventional practice. Each time the line relay R1140X restores it completes, at its contacts 1141X, a circuit including the contacts 1152X and the conductor C1138X extending via the controller 600X portion of the register sender for registering in the call register 1500X portion the digit dialed by the calling subscriber.

Referring to the schematically illustrated call register 1500X, it will be seen that the receive sequence switch 1510X is normally positioned with its wipers in engagement with the first contacts of the associated contact banks. In this position, the wiper 1514X is in engagement with the conductor C1551X extending to the first called office code register. Accordingly, each of the impulses of the first digit are repeated by the line relay R1140X over the conductor C1138X to the controller and from the controller via the conductor C717X and the wiper 1514X to the conductor C1551X. The first called office code register is operated over this circuit to register the first called office code digit.

Additionally, the wiper 1516A is in engagement with the conductor C442A at the first contact of its contact bank. At its contacts 441, the line relay R1140X also attempts to repeat impulses to the set 3000A of calling party identifying relays in the call recorder 2000X via the wiper 1516A and the conductor C442A. However, due to the fact that the relays R310 and R317 of the relay set 3000A are in their restored positions at this time, the calling party identifying relays are not operated under control of the line relay R1140X. Further, the wiper 1516X is in engagement with the conductor C1517XA at the first contact in its contact bank. The wiper 1516X is adapted to transmit via the conductor C1199X the ground pulses resulting from closure of contacts 1131X by the operated relay R1130X. Ground pulses applied to the wiper are employed to operate relays R317, R310, R326, R320, R335 and R330 in the relay set 3000A. Though the windings of the party relay R1130X are energized and deenergized each time the circuit is interrupted by the impulsing springs 142, the relay is not operated due to the differential action between the windings thereof.

At the end of the first digit, the line relay R1140X remains in its operated position in order to retain the hold relay R1150X operated. Also, at the end of the first digit, the controller 600X controls the rotary magnet RM1511X of the receive sequence switch 1510X to advance its wipers into engagement with the second set of contacts in the associated contact banks. The wiper 1514X now prepares a circuit including the conductor C1552X for controlling the second called office code register to register the second digit dialed by the calling subscriber.

The wiper 1516X prepares a circuit including conductor C1517XB for controlling a portion of calling party identifying relays in the set 3000B of the call recorder 2000X and the wiper 1516A prepares a circuit including conductor C442B for controlling the remainder of the calling party identifying relays in set 3000B for registering the identity of the position of the calling subscriber station on the party line a second time.

In view of the foregoing, it should be understood that after each digit is dialed by the calling subscriber, the wipers of the receive sequence switch 1510X are advanced an additional step whereby the wiper 1514X successively engages the conductors C1551X to C1557X to successively connect the three called office code registers and the four numerical registers in the call register 1500X to receive and register the seven digits dialed by the calling subscriber.

The calling subscriber at the station TS1 may now actuate his calling device in accordance with the digit corresponding to the second letter of the called subscriber directory number. As previously noted, this digit may also be any digit from 2 to 9, inclusive, and in response to the impulses corresponding to the dialed digit, the line relay R1140X repeats the impulses, at its contacts 1141X, to the second called office code register in the call register 1500X. At its contacts 441, the line relay R1140X also attempts to repeat impulses to the set 3000B of calling party identifying relays via the wiper 1516A and the conductor C442B. However, because the relay R1130X is not operated at this time, none of the calling party identifying relays in set 3000B is operated.

As explained heretofore, at the end of the transmission of the second dialed digit, the receive sequence switch 1510X is controlled to advance its wipers into engagement with the third set of contacts in the associated contact banks, as previously noted, to prepare the impulsing circuit for the third called office code register. The subsequent impulses of the digits dialed by the calling subscriber control the line relay R1140X, in the manner described above, to register the remaining digits in the call register 1500X portion of the director, in the manner previously described.

All digits of the called subscriber directory number are now registered in the call register 1500X. However, as soon as the three digits of the called office code, i. e., the digits corresponding to the first two letters of the called exchange, are registered, the register sender 300X controls the translator assigner 1000X to connect the common translator 1300X to the register sender 300X. As a result of this connection, the translator is operated in accordance with the three digits of the called office code and it immediately registers in the coder 1800X portion of the register sender the routing digits which are to be utilized by the register sender in routing the particular call to the desired called exchange. The translator also controls the register sender to thereafter transmit certain ones of the digits of the called subscriber directory number as registered in the call register 1500X in order to complete the connection to the desired called subscriber station. The translator 1300X also controls the register sender so that the call recorder 2000X individually associated therewith will be utilized to register the directory number of the calling subscriber station. Thereafter, the translator 1300X is released from the calling register sender and made available for use by other register senders in the exchange.

As previously noted, the registration of the called office code digits in the call register 1500X portion of the register sender controls the translator 1300X to initiate the operation of the call recorder 2000X. During the time that the register sender is transmitting the various routing digits and the selected ones of the digits registered in the call register 1500X in order to establish the connection with the called subscriber station, the call recorder 2000X is associated with the detector 1900X by way of the contacts 1 to 8, inclusive, of the detector connect relay R1910X. In the present call, the calling subscriber at station TS1 is the first station on a party line and therefore the dial thereat is not provided with the previously mentioned station identifying cams. Therefore, when the dial at the station TS1 or an individual subscriber station, such as the station TS3, is actuated in accordance with the digits of the called subscriber directory number, no ground impulses are transmitted over the line conductors to the party relay R1130X. Hence, all of the calling party relays in both sets 3000A and 3000B remain in their restored positions. Since all of the calling party identifying relays are in their restored positions when the detector connect relay R1910X is operated to associate the call recorder 2000X with the detector 1900X, the individual or party 1 relay R560X in the detector 1900X is operated over a circuit extending from ground through the contacts 316 in the set 3000A and the corresponding contacts in the set 3000B, the party 1 conductor, the contacts 1 of the detector connector relay R1910X, the winding of relay R560X, the bus line B243 and the winding of the relay R240 to negative battery.

The relay R560X registers the fact that the calling subscriber station is either an individual line or is the first station on a party line. As a further result of the association of the call recorder 2000X with the detector 1900X, the identification marking relay shown in Fig. 4 is operated to substitute a positive sixty volt booster battery potential for the direct ground potential applied to the holding conductor C2125X. The booster battery potential is applied to the conductor C2125X for the purpose of controlling the detector 1900X to determine and register the four digits of the numerical portion of the directory number of the particular calling subscriber station.

Before describing the circuit over which the booster battery potential is applied to the calling subscriber line, it may be advisable to briefly describe the detector 1900X. At the outset it should be noted that the detector has access to ten thousand terminals in the connector banks of the local switch train terminating the various subscriber lines. The detector includes one hundred group relays, such as the 1100 group relay R210X, one hundred group marking relays, such as the relay R215X, one hundred common group connect relays, such as the relay R225X, and one hundred common tens and units marking relays, not shown, 00 to 99, inclusive. The one hundred common tens and units marking relays may be selectively connected to each of the separate hundred groups, such as the 1100 group, via the contacts of the common group connect relay, such as the relay R225X. Referring now to the 1100 group, which includes the relays R210X, R215X and R225X, it will be seen that the relay R210X is commonly connected through one hundred separate resistors and associated gas-filled discharge tubes G1100 to G1199, inclusive, to the one hundred identifying conductors C1100 to C1199, inclusive, in the 1100 group. The one hundred identifying conductors are individually connected to the one hundred connector bank terminals corresponding to the subscriber stations having the digits 1100 to 1199, inclusive, as the numerical portion of the directory number. The relay R210X is also connected by way of one of the multiple contacts of the individual and party 1 control relay R510X to one of the multiple contacts of the individual or party 1 relay R560X. The remaining hundred groups 1200, 1300, etc., in the detector including relays which are connected and arranged in substantially the same manner as the relays R210X, R215X and R225X in the 1100 group noted above, and which are connected to corresponding 1200, 1300, etc., groups of identifying conductors.

The detector 1900X also includes an alarm relay R240 which includes a single winding and is of the marginal operating type. The one terminal of the winding of relay R240 is connected to battery potential and the other terminal is connected in multiple to one terminal of the winding in the party 1 through party 8 relays so that when a relay such as, for example, R560X is connected to ground over a path including the party 1 conductor and contacts 316, the single winding of the alarm relay is also energized but insufficiently to operate the relay. Should the alarm relay R240 be energized from ground over paths extending through 2 party relays, such as, for example, R560X and R570X, the alarm relay R240 becomes energized sufficiently to operate, thereby applying ground at the contacts 241 to the alarm conductor C242 extending by way of example, to an operator alarm position.

The detector 1900X is also provided with seven additional party control relays designated party 2 to party 8, inclusive, which are substantially identical to the individual and party 1 control relay R510X. The party 1 to party 8 relays are selectively operated, in the manner to be described hereinafter, by the calling party identifying relays of Fig. 3 to prepare circuits in the detector 1900X whereby the particular hundred group thereat will be selectively operated by the booster battery potential applied to a particular calling subscriber line to register the calling exchange, the numerical digit, the thousands, hundred, tens and units digits corresponding to the numerical portion of the directory number of the particular calling subscriber station.

In the call being described, the individual or party 1 relay R560X is operated when the call recorder 2000X is associated with the detector 1900X and the alarm relay R240 is energized but not operated thereby. At its upper make contact, the relay R560X completes a series circuit for operating the relay R510X and the group control relay R550X. At its multiple contacts, the relay R510X completes a circuit for applying battery potential to the winding of the group relay R210X in the 1100 group. Other multiple contacts on the relay R510X will also complete circuits for applying battery potential to the windings of all other group relays, such as the relay R210X, in all of the other hundred groups which are connected to identifying conductors associated with terminals of individual lines and the terminals of the first stations on party lines.

Returning again to the identifying marking relay of Fig. 4, it will be seen that the ground potential normally applied to the conductor C2125X is connected via the register sender 300X, the conductor C473X, the wiper 458X, the conductor C506X, the primary selector 500X, the conductor C446X, the finder 440X, the wiper 436X, the conductor C108, the line circuit 105 and to the C conductor in the cable 104 to the C terminal in the connector banks of all connectors having access to the calling party line. This ground potential normally maintains the primary selector 500X, the finder 440X and the line circuit 105 in their operated positions; it busies these units of equipment to other apparatus having access thereto and it marks the calling eight-party line busy to all of the connectors having access thereto. Attention is directed to the fact that the holding and busy marking ground potential is also connected via the eight identifying marking conductors C1199, C1299, etc. to C1899, inclusive, to the corresponding hundred groups in the detector 1900X. The ground potential connected to the identifying marking conductors, however, does not effect operation of any of the group relays, such as the relay R210X.

As soon as the identification marking relay operates and substitutes the positive sixty volt booster battery for the direct ground potential on the conductor C2125X, the various units of equipment are maintained in their operated positions, the busy condition is retained to prevent seizure thereof and the eight-party line is maintained busy to prevent seizure of the calling party line by the connectors having access thereto and the positive sixty volt booster battery is simultaneously applied to eight identifying conductors C1199, etc., corresponding respectively to the eight stations TS1 to TS9, inclusive, on the calling eight-party line. Although the booster battery potential is applied to all eight identifying conductors in eight separate hundred groups, only the identifying conductor C1199 is connected to a group relay that is in condition to be operated. More specifically, the positive booster battery connected to the marking conductor C1199 individual to the calling subscriber station TS1 is connected via the associated gas-filled discharge tube G1199, the associated resistor, the winding of the group relay R210X in the 1100 group, a contact of the operated party 1 control relay R510X and a contact of the individual or party 1 relay R560X, to battery. The potential differences across the two electrodes of the gas-filled discharge device G1199 renders the tube conductive whereby the current flow over the above traced circuit causes the operation of the relay R210X. Upon operating, the relay R210X, at its contacts 211X, completes an obvious circuit for operating the group marking relay R215X which relay now locks itself in its operated position over a circuit including its contacts 216X. At its contacts 218X to 223X, inclusive, the relay R215X completes circuits for marking the conductors in the cables 125X to 127X, inclusive, in accordance with the digit 3 identifying the FLorida 3 exchange in the Florida office and the thousands digit 1 and the hundreds digit 1 of the numerical portion of the directory number of the calling subscriber at station TS1. As a further result of the operation of the relay R215X, at its contacts 217X, it completes an obvious circuit for operating the common group connect relay R225X. The latter relay, upon operating, connects the one hundred identifying conductors C1100 to C1199, inclusive, to the one hundred common tens and units marking relays 00 to 99, inclusive. The positive sixty volt booster battery connected to the identifying conductor C1199 now operates the tens and units marking relay 99 connected thereto in order to register the tens digit 9 and the units digit 9 of the numerical portion of the directory number of the calling subscriber at station TS1. Each of the five digits identified by the detector 1900X are registered in the call recorder 2000X in the manner described in the above mentioned Ostline patent No. 2,639,330 and the detector 1900X is disconnected therefrom upon the restoration of the detector connect relay R1910X. Also, the identifying marking relay shown in Fig. 4 is restored to normal thereby to again apply the direct ground potential to the conductors C2125X.

As soon as the identification of the calling subscriber line has been completed, the register sender 300X may now transmit the exchange digit 3 identifying the calling FLorida 3 exchange followed by the digits 1199 identifying the first station TS1 on the calling party line and any other items of information, such as the called subscriber directory number, to the toll ticket repeater 2300X. After all of the items of information pertaining to the particular connection have been registered in the toll ticket repeater 2300X, the director will then transmit the last two digits of the called subscriber directory number in order to complete the connection to the desired called subscriber station as previously described.

When the called subscriber answers, the toll ticket repeater operates to time the call and upon the subsequent release of the connection, the total elapsed conversational time will be registered therein. It should be noted that upon the release of the connection by the calling and called subscribers all of the switching apparatus except the toll ticket repeater 2300X and the associated repeater selector 2700X (not shown) are restored to normal. The toll ticket repeater 2300X, as well as the associated repeater selector 2700X, is retained in its operated position until all of the items of information registered therein have been transferred to an idle tabulator, such as the tabulator 2800X. After the various items of record information have been transferred, the toll ticket repeater 2300X and the repeater selector 2700X are restored to normal and rendered available for additional calls. Thereafter, the tabulator 2800X in conjunction with the date and time unit U2853X controls the record and tape punch mechanisms 2967X and 2968X in order respectively to produce a perforated tape containing a common record of certain of the items of record information and a perforated tape containing an individual record of certain of the items of record information pertaining to the established connection.

*Identifying station TS2*

If the above call is originated at the second station TS2 on the eight party line instead of at the first station TS1, the operation of the equipment to complete the connection to the called subscriber station is substantially the same as has been described. However, since the dial at station TS2 includes the cam 181 and the associated contacts 131 for momentarily applying a short ground impulse identifying the station to the line conductors 102 and 103 just prior to the transmission of the next to the last switch controlling impulse of each dialed digit, both the party relay R1130X and the line relay R1140X are selectively controlled to operate certain of the calling party identifying relays in the call recorder 2000X to register the fact that the calling station is the second station on an eight party line. Each of the remaining stations TS3 to TS8, inclusive, are also provided with cams and associated contacts, as previously noted, for controlling the operation of the calling party identifying relays to register the position of the respective stations on the eight party line.

Referring to the calling party identifying relay set 3000A shown in Fig. 3, it will be seen that the conductors 1517XA and C442A, over which the calling party identifying relay set 3000A is selectively operated, are connected via the wipers 1516X and 1516A and to the respective contacts 1131X and 441 to ground only during the dialing of the first digit of the called station directory number. Further as explained heretofore, the calling party identifying relay set 3000B shown in Fig. 3 is selectively operated over a path including conductors C1517XB and C442B, the wipers 1516X and 1516A, and the contacts 1131X and 441, respectively, only during the dialing of the second digit of the called station directory number. Any operations of the relays R1130X and R1140X during the dialing of other digits of the called station directory number have no effect on the calling party identifying relay sets. In view thereof, the following description of the operations of the circuits will be limited to the operation thereof during the dialing of the first and second digits. Thus, the loop circuit for any calling station on the particular party line includes the impulsing springs at this station and the line conductors 102 and 103 which are connected by the previously described units to the conductors C471X and C472X respectively, to the code switch 1100X. The conductor C471X is connected via the lower winding of the relay R1130X, the upper winding of the line relay R1140X and the resistor 1154X to the negative terminal of the auxiliary 48 volt battery 1156X. At this time, the conductor C472X is also connected via the upper winding of relay R1130X and resistor 1155X to the junction between the negative terminal of the exchange battery 442 and the positive terminal of the auxiliary 48 volt battery 1156X. In the above described loop circuit, the windings of the differential type relay R1130X are energized in opposite directions to prevent operation of the relay R1130X during the periods that the loop is closed and also facilitating for the line relay R1140X to be rendered in its operated position.

With the relays R1130X and 1140X in the positions indicated, the calling subscriber at the station TS2 actuates his dial in accordance with the digit corresponding to the first letter of the called station directory number. This digit may be any digit from 2 to 9, inclusive, and, during the return movement, the dial will interrupt the impulsing springs 143 a number of times corresponding to the value of the digit. However, during the return movement of the dial, the cam 181 will also control its associated contacts 131 to transmit a single short ground impulse just prior to the transmission of the next to the last switch controlling impulse as is clearly illustrated by the lines 601 and 603 in Fig. 6. Accordingly, at the time the single ground impulse is transmitted, the impulsing springs 143 are closed so that the ground pulse is applied to the line conductors 102 and 103. As soon as the ground potential is applied to the line conductors, the current flow through the windings of the party relay R1130X is altered so that the relay will operate in series with the line relay R1140X. More specifically, the ground potential applied to the line conductor 103 is extended via the conductor C472X, the upper winding of the relay R1130X, the resistor 1155X and the negative terminal of the —48 volts exchange battery to ground. Simultaneously therewith, the ground potential applied to the conductor 102 is extended via the conductor C471X, and the lower winding of the party relay R1130X, the upper winding of the relay R1140X, the resistor 1154X and the junction between the negative terminal of the auxiliary 48 volt battery 1156X and the negative terminal of the 48 volt battery to ground. Accordingly, the current flow through the upper winding is now energized in the same direction as the lower winding. It will also be appreciated that the current flow through the windings of the relay R1130X and R1140X is increased considerably by the inclusion of the two 48 volt batteries in series. As soon as the relay R1130X operates, it completes, at its contacts 1131X, a circuit including the conductor C1199X, the wiper 1516X, the conductor C1517XA, and the contacts 312 for operating the relay R317. As soon as the ground potential is removed from the line conductors 102 and 103, the loop circuit for the relays R1130X and R1140X is restored to again change the current flow through the windings of the relay R1130X so that the relay immediately restores to normal. However, as previously noted, the line relay R1140X is retained in its operated position. As soon as the relay R1130X restores, at its contacts 1131X, it removes ground potential from the conductor C1517XA.

Referring now to the relay R317, it will be seen that when the relay operates it prepares, at its contacts 318, a locking circuit for itself in series with the relay R310. However, this locking circuit does not become effective until the ground potential is removed from the conductor C1517XA upon the restoration of the party relay R1130X. Consequently, when the ground potential is removed from the conductor C1517XA the locking circuit for the relay R317 is completed via the contacts 318, the winding of the relay R310 and the ground at conductor C725X. It should be noted at this time that the conductor C725X is grounded in the controller 600X portion of the register sender 300X until the director is released. The relay R310 is operated in series with the relay R317 and it prepares, at its contacts 311, a point in the circuit for operating the relay R326 and, at its contacts 313, it prepares a point in the circuit for subsequently operating the relay R365.

Shortly after the transmission of the short ground impulse, the circuit for the relays R1130X and R1140X is interrupted two times by the impulsing springs 143. Each time the line relay R1140X momentarily restores to normal, it applies at its contacts 441 a ground potential to the conductor C442A. However, the ground potential applied to the conductor C442A has no effect at this time inasmuch as the calling party identifying relay R326 has not been operated.

From the foregoing, it will be understood that the single short ground impulse transmitted by the cam 181 at station TS2 will cause the operation of only the calling party identifying relays R317 and R310. The relay R310, at its contacts 315 will therefore complete a circuit via the contacts 325 and 334 to the party 2 conductor.

Subsequently, the calling subscriber at the station TS2 actuates his dial in accordance with the digit corresponding to the second letter of the called station directory number. This digit may be any digit from 2 to 9, inclusive, and during the return movement, the dial will interrupt the impulsing springs 143 a number of times corresponding to the value of the digit and the cam 181 will also control its associated contacts 131 to transmit a single short ground impulse just prior to the transmission of the next to the last switch controlling impulses as is illustrated by the lines 601 and 603 in Fig. 6. As described heretofore, at the time of the dialing of the digit corresponding to the second letter of the called station directory number, the switches 1516X and 1516A are rotated to their second contact position thereby completing a connection to the conductors C1517XB and C442B, respectively, extending to the calling party identifying relay set 3000B. Accordingly, and as described above with reference to the dialing of the first letter of the called station directory number at the station TS2, the calling party identifying relays included therein will be operated in accordance with the ground impulses transmitted by the dial. Assuming that there has been no manipulation of the switchhook during the dialing of either the first or second letter of the called station directory number, and there has been no other fault in the telephone circuits, the operated calling party identifying relays in relay set 3000A will cause a connection to be completed from ground to party 2 conductor. Thereafter, the detector 1900X is associated with the call recorder 2000X by the operation of relay R1910X whereby the party 2 conductor is connected via contacts 2 of the detector connect relay R1910X to the winding of the party 2 relay R570X and the winding of the alarm relay R240 to negative battery. Thereupon, the relay R570X is operated and the detector is controlled to identify the digits 1299 of the directory number of the station TS2 in the 1200 group. At the same time the alarm relay R240 is energized but not operated.

In response to the dialing of the called station directory number from the station TS2, the same calling station identifying relays in relay sets 3000A and 3000B should be operated, in which case, the system operates as above described. However, it is possible that the station identifying ground impulses might be mutilated in some manner during dialing at the calling station in which case it is desirable that some means be provided for operating an alarm. In case that different ground impulses are transmitted to the calling station identifying relay sets 3000A and 3000B during the dialing of the first and second letters, two party relays, for example, the party 2 relay R570X and the party 3 relay R580X, will be operated in a path extending from ground via the party 2 conductor and the party 3 conductor and the relays R570X and R580X, respectively, to the alarm relay R240 and to negative battery. The energization of relay R240 through two party relays is sufficient to operate relay R240 thereby closing contacts 241 and extending ground potential to the alarm conductor C242. The alarm conductor may extend to a signal lamp at an operators position. Responsive to the alarm, the party at station TS2 may then be informed by means of a tone or by an operator that a fault has been detected in his call.

*Identifying Station TS3*

If the above described call is originated at the third station TS3 on the eight party line, the cam 182 thereat actuates the associated contacts 132 to transmit two short ground impulses during the return movement of the dial as is clearly illustrated by the lines 604 and 601 in Fig. 6. The first short ground impulse is transmitted just prior to the transmission of the next to the last switch controlling impulse by the impulsing springs 144 in the same manner as previously described in connection with the operation of the cam 181 at station TS2. Consequently, the party relay R1130X operates and restores to transmit a first short ground impulse over the conductor C1517XA. The relay R317 operates in response to the first ground impulse on conductor C1517XA and at the end of the impulse it locks itself in series with the relay R310. The dial at station TS3 in returning to normal now controls the impulsing springs 144 to transmit the next to the last switch controlling impulse. In response thereto the line relay R1140X normally restores and transmits a short ground impulse over the conductor C442A but this impulse has no effect on the calling party identifying relays due to the fact that the contacts 314 and 328 are open at the present time. Immediately after the transmission of the next to the last switch controlling impulse, the second short ground impulse is transmitted by the cam 182 in order to momentarily reoperate the party relay R1130X. At its contacts 1131X, the relay R1130X transmits the second short ground impulse over the conductor C1517XA and then via the contacts 311 and 322 and the winding of the relay R326, to battery. The relay R326 operates over this circuit and at the end of the impulse, i. e. as soon as the relay R1130X restores to normal, ground potential is removed from the conductor C1517XA and the relay R326 locks itself via its contacts 327 in series with the relay R320 to the grounded conductor C725X. The dial at station TS3 now controls the impulsing springs 144 to transmit the last switch controlling impulse in order momentarily to restore the line relay R1140X. At its contacts 441, the relay R1140X momentarily applies ground potential to the conductor C442A but since the contacts 322 are now opened by the operated relay R320, this ground impulse is without effect at this time.

In view of the foregoing, it will be seen that at the end of the dialing of the first digit by the subscriber at station TS3, the calling party identifying relays R317, R310, R326 and R320 in set 3000A are operated in the order named to register the fact that the third station TS3 on the eight party line originated the call. Assuming that no mutilation has occurred, the same relays in the calling party identifying relay set 3000B will be operated at the end of the dialing of the second digit. With the above named relays in their operated positions, circuits will be completed from ground via contacts 315, 324, 333, 368 and 345 in the relay set 3000A and the relay set 3000B to the party 3 conductor and the contacts 3 of relay R1910X for operating the party 3 relay R580X as soon as the detector 1900 is associated with the call recorder 2000X by the operation of the relay R1910X. The operated condition of the party 3 relay R580X controls the detector 1900X to identify the digits 1399 of the directory number assigned to station TS3 in the 1300 group.

*Identifying station TS4*

If the above described call is originated at the fourth station TS4 on the eight party line, the cam 183 thereat will actuate the associated contacts 133 to transmit three short ground impulses during the return movement of the dial as is clearly illustrated by the lines 605 and 601 in Fig. 6. The first and second short ground impulses are transmitted respectively just prior to the transmission of the next to the last and the last switch controlling impulses by the impulsing springs 145 in the same manner as has been described above in connection with the operation of the cam 182 at station TS3. Consequently, the party relay R1130X operates and restores two times to transmit the first and second ground impulses over the conductor C1517XA to operate in the order named the calling party identifying relays R317, R310, R326 and R320. Shortly after the transmission of the last switch controlling impulse by the impulsing springs 145, a third short ground impulse is transmitted by the cam 183 thereby to momentarily restore the party relay R1130X a third time. At its contacts 1131X, the relay R1130X transmits the third short ground impulse via the conductor C1517XA, the contacts 311, 321 and 331 in order to operate the relay R335. At the end of the third short ground impulse transmitted over the conductor C1517XA, the relay R335 locks itself via its contacts 336 and the winding of the relay R330 to the grounded conductor C725X. The relay R330 operates in series with relay R335.

In view of the foregoing, it will be seen that at the end of the dialing of the first digit by the subscriber at station TS4, the calling party identifying relays R317, R310, R326, R320, R335 and R330 in set 3000A are operated in the order named to register the fact that the fourth station TS4 on the eight party line originated the call. Assuming that no mutilation has occurred, the corresponding relays in calling party identifying relay set 3000B will be operated at the end of the dialing of the second digit. With the above named relays in their operated positions, circuits will be completed from ground via contacts 315, 324 and 332 in the relay set 3000A and in the relay set 3000B to the party 4 conductor and the contacts 4 of the relay R1910X for operating the party 4 relay R590X as soon as the detector 1900 is associated with the call recorder 2000X by the operation of the relay R1910X. The operated condition of the party 4 relay R590X controls the detector 1900X to identify the digits 1499 of the directory number assigned to station TS4 in the 1400 group.

*Identifying station TS5*

If the above described call is originated at the fifth station TS5 on the eight party line, the cam 184 thereat will actuate the associated contacts 134 to transmit a long ground impulse, which overlaps the transmission of the next to the last switch controlling impulse by the impulsing springs 146, during the return movement of the dial, as is clearly illustrated by lines 606 and 601 in Fig. 6. During the return movement of the dial at station TS5, the cam 184 controls the associated contacts 134 to apply ground potential to the line conductors 102 and 103 just prior to the transmission of the next to the last switch controlling impulse by the impulsing springs 146. The ground potential applied to the line conductors 102 and 103 operates the party relay R1130X in the manner previously described, in order to apply ground potential via its contacts 1131X, the wiper 1516X, the conductor C1517XA, the contacts 312 and the winding of relay R317, to battery. The relay R317 now operates in the manner previously described and prepares, at its contacts 319, a circuit for operating the relay R347. While the cam 184 retains the ground potential on the line conductors 102 and 103, the next to the last switch controlling impulse is transmitted by the impulsing springs 146. As soon as the impulsing springs 146 are opened, the ground potential at contacts 134 is removed from the line conductor 102 in order to interrupt the previously described circuit including the conductor C471X, the lower winding of the party relay R1130X and the upper winding of the line relay R1140X. However, at this time, the ground potential is retained on the conductor 103 in order to retain the party relay R1130X in its operated position over the energizing circuit including its upper winding. The line relay R1140X now restores to normal and, at its contacts 441, applies ground potential via the wiper 1516A, the conductor C442A, the contacts 314, 319 and 342 and the winding of relay R347, to battery. The relay R347 now operates and at the end of the impulse, i. e., when the impulsing springs 146 are again closed, ground potential is reapplied to the line conductor 102 in order to reoperate the line relay R1140X and to again energize the lower winding of the party relay R1130X. As soon as the relay R1140X operates, it interrupts, at its contacts 441, the circuit for relay R347. The relay R347 now locks itself in its operated position via its contacts 348 and the winding of the relay R340 to the grounded conductor C725X. Shortly after the transmission of the next to the last impulse by the impulsing springs 146, the cam 184 controls the associated contacts 134 to remove ground potential from the line conductors 102 and 103 and thereby reestablishes the previously described loop circuit including the calling station impulse springs 146, the two windings of the party relay R1130X and the upper winding of the line relay R1140X. As soon as the loop circuit is reestablished, the windings of the party relay R1130X are energized in opposition to each other in order to restore the relay to normal. At its contacts 1131X, the relay R1130X removes ground potential from the conductor C1517XA. As soon as the ground potential is removed from the conductor C1517XA, the relay R317 locks itself in its operated position via its contacts 318, and the winding of the relay R310, to the grounded conductor C725X. The relay R310 operates in series with relay R317 when the above mentioned locking circuit is completed.

In view of the foregoing, it will be seen that at the end of the dialing of the first digit by the subscriber at station TS5, the calling party identifying relays R317, R310, R347 and R340 in the set 3000A are operated in the order named to register the fact that the fifth station TS5 on the eight party line originated the call. Assuming that no mutilation has occurred, the same relays in calling party identifying relay set 3000B will be operated at the end of the dialing of the second digit. With the above named relays in their operated positions, circuits will be completed from ground via contacts 315, 325, 343 and 353 in the relay set 3000A and the relay set 3000B to the party 5 conductor and the contacts 5 of the relay R1910X for operating the party 5 relay as soon as the detector 1900 is associated with the call recorder 2000X by the operation of the relay R1910X. The operated condition of the party 5 relay controls the detector 1900X to identify the digits 1599 of the directory number assigned to station TS5 in the 1300 group.

*Identifying station TS6*

If the above described call is originated at the sixth station TS6 on the eight party line, the cam 185 thereat will actuate the associated contacts 135 to transmit a long ground impulse, which overlaps the transmission of the next to the last switch controlling impulse by the impulsing springs 147, and a short ground impulse, which is transmitted immediately following the transmission of the last switch controlling impulse by the impulsing springs 147, during the return movement of the dial as is clearly illustrated by the lines 607 and 601 in Fig. 6. During the return movement of the dial at station TS6, the cam 185 controls the associated contacts 135 to apply ground potential to the line conductors 102 and 103 just prior to the transmission of the next to the last switch controlling impulse by the impulsing springs 147. The ground potential applied to the line conductors 102 and 103 operates the party relay R1130X and the calling party identifying relay R317 in the manner previously described. The cam 185 retains the ground potential on the line conductors 102 and 103 during the time that the next to the last switch controlling impulse is transmitted by the impulsing springs 147 to the line relay R1140X. As soon as the impulsing springs 147 are opened, the ground potential at contacts 135 is removed from the line conductor 102 in order to interrupt the circuit for the line relay R1140X. The relay R1140X momentarily restores to normal and transmits a short ground impulse over the conductor C442A in order to operate the relay R347 and in order to operate the relay R340 in series with the relay R347 as soon as the short ground impulse is removed from the conductor C442A in the manner previously described. Shortly after the transmission of the next to the last switch controlling impulse by the impulsing springs 147, the cam 185 controls the associated contacts 135 to remove ground potential from the line conductors 102 and 103. At this instant, the previously described loop circuit including impulsing springs 147, the two windings of the party relay R1130X and the winding of the line relay

R1140X is reestablished. Since the windings of the party relay R1130X are now energized in opposite directions, the relay restores to normal. The line relay R1140X, however, is retained in its operated position. As soon as the party relay R1130X restores to normal, it removes ground potential, at its contacts 1131X, from the conductor C1517XA thereby to cause the relay R317 to lock itself in its operated position in series with the relay R310 to the grounded conductor C725X. The relay R310, as previously noted, operates when the above mentioned locking circuit is completed. At this time, the dial controls the impulsing springs 147 to transmit the last switch controlling impulse to the line relay R1140X, in the manner previously described. The relay R1140X momentarily restores to normal and, at its contacts 441, applies ground potential to the conductor C442A. This ground impulse has no effect at this time due to the fact that the contacts 314 and 328 are open. Immediately following the transmission of the last switch controlling impulse by the impulsing springs 147, the cam 185 controls the associated contacts 135 to transmit a short ground impulse over the line conductors 102 and 103. Accordingly, the party relay R1130X momentarily operates and restores to transmit, at its contacts 1131X, an additional short ground impulse over the conductor C1517XA. The short ground impulse is transmitted via the contacts 311 and 322 in order to operate the relay R326 and when the ground potential is removed, at the end of the short ground impulse, the relay R326 locks itself via its contacts 327 and the winding of the relay R320 to the grounded conductor C725X. The relay R320 operates over the above mentioned locking circuit.

In view of the foregoing, it will be seen that at the end of the dialing of the first digit by the subscriber at station TS6, the calling party identifying relays R317, R310, R326, R320, R347 and R340 in the set 3000A are operated in the order named to register the fact that the sixth station TS6 on the eight party line originated the call. Assuming that no mutilation has occurred, the same relays in calling party identifying relay set 3000B will be operated at the end of the dialing of the second digit. With the above named relays in their operated positions, circuits will be completed from ground via contacts 315, 324, 333, 368 and 346 in the relay set 3000A and in the relay set 3000B to the party 6 conductor and the contacts 6 of the relay R1910X for operating the party 6 relay as soon as the detector 1900 is associated with the call recorder 2000X by the operation of the relay R1910X. The operated condition of the party 6 relay controls the detector 1900X to identify the digits 1699 of the directory number assigned to station TS6 in the 1600 group.

*Identifying station TS7*

If the above described call is originated by the seventh station TS7 on the eight party line, the cam 186 thereat will actuate the associated contacts 136 to transmit an extra long ground impulse which overlaps the transmission of the next to the last and the last switch controlling impulses by the impulsing springs 148, during the return movement of the dial as is clearly illustrated by lines 608 and 601 in Fig. 6. During the return movement of the dial at station TS7, the cam 186 controls the associated contacts 136 to apply ground potential to the line conductors 102 and 103 just prior to the transmission of the next to the last switch controlling impulse by the impulsing springs 148 and to retain the ground potential on the line conductor 103 until shortly after the last switch controlling impulse has been transmitted by the impulsing springs 148. As previously noted, the party relay R1130X operates as soon as the ground potential is applied to the line conductors 102 and 103 thereby to complete the previously described circuit for operating the relay R317. Shortly thereafter, the impulsing springs 148 are operated to momentarily remove ground potential from the line conductor 102 two times in order to transmit the next to the last and the last switch controlling impulses to the line relay R1140X. The ground potential retained on the conductor 103 by the contacts 136 retains the party relay R1130X in its operated position during the time the line relay R1140X is momentarily restored two times in accordance with the next to the last and the last switch controlling impulses transmitted by the impulsing springs 148. The first time the line relay R1140X restores to normal after the operation of the relay R317, the ground potential at its contacts 441, completes a circuit via the conductor C442A, contacts 314, 319 and 342 for operating the relay R347. As soon as the line relay R1140X reoperates at the end of the impulse, the ground potential is removed at contacts 441 and the relay R347 locks itself via its contacts 348 and the winding of the relay R340 to the grounded conductor C725X. The relay R340 operates in series with the relay R347 and, at its contacts 341, prepares a point in the circuit for operating the relay R355. As soon as the line relay restores in response to the last impulse transmitted by the impulsing contacts 148, the ground potential is again applied to the conductor C442A thereby to operate the relay R355 over the previously described circuit. When the line relay R1140X reoperates at the end of the last impulse, it removes ground potential from the conductor C442A and causes the relay R355 to complete a locking circuit for itself via the contacts 356 and the winding of the relay R350 to the grounded conductor C725X. Immediately following the transmission of the last impulse by the impulsing springs 148, the cam 186 controls the associated contacts 136 to remove ground potential from the line conductors 102 and 103 and thereby reestablishes the previously described loop circuit including the impulsing springs 148, the two windings of the party relay R1130X and the upper winding of the line relay R1140X. At this time, the party relay R1130X restores to normal, due to the direction of the current flow in its differential windings, and the line relay R1140X is retained in its operated position. At its contacts 1131X, the relay R1130X now removes ground potential from the conductor C1517XA thereby to permit the relay R317 to lock itself in its operated position in series with the relay R310 to the grounded conductor C725X. The relay R310 operates in series with the relay R317.

In view of the foregoing, it will be seen that at the end of the dialing of the first digit by the subscriber at station TS7, the calling party identifying relays R317, R310, R347, R340, R355 and R350 in the set 3000A are operated in the order named to register the fact that the seventh station TS7 on the eight party line originated the call. Assuming that no mutilation has occurred, the same relays in calling party identifying relay set 3000B will be operated at the end of the dialing of the second digit. With the above named relays in their operated positions, circuits will be completed from ground via contacts 315, 325, 343 and 352 in the relay set 3000A and in the relay set 3000B to the party 7 conductor and the contacts 7 of the relay R1910X for operating the party 7 relay as soon as the detector 1900 is associated with the call recorder 2000X by the operation of the relay R1910X. The operated condition of the party 7 relay controls the detector 1900X to identify the digits 1799 of the directory number assigned to station TS7 in the 1700 group.

*Identifying station TS8*

If the above described call is originated at the eighth station TS8 on the eight party line, the cam 187 thereat will actuate the associated contacts 137 to transmit a short ground impulse just prior to the transmission of the next to the last switch controlling impulse by the impulsing springs 149 and to transmit a long ground impulse which overlaps the transmission of the last switch controlling impulse by the impulsing springs 149, during the return movement of the dial, as is clearly illustrated by lines 609 and 601 in Fig. 6. During the return movement of the dial at station TS8, the cam 187 controls the associated contacts 137 to transmit a short ground impulse over the line conductors 102 and 103 just prior to the transmission of the next to the last switch controlling impulse by the impulsing springs 149. The party relay R1130X momentarily operates, in the manner previously described, to transmit, at its contacts 1131X, a short ground impulse over the conductor C1517XA. The relay R317 operates in response to the short ground impulse over the conductor C1517XA and, at the end of the impulse, locks itself in series with the relay R310 in the manner previously described. The relay R310 now operates and, at its contacts 311 and 313 prepares points in the circuit for operating the relays R326 and R365, respectively. The dial at station TS8 now controls the impulsing springs 149 to transmit the next to the last switch controlling impulse thereby to interrupt the circuit including the line conductors 102 and 103 and the line relay R1140X, in the manner previously described, to transmit a short ground impulse over the conductor C442A. However, this short ground impulse is without effect at the present time due to the fact that the relay R326 is in its restored position. Shortly after the transmission of the next to the last switch controlling impulse by the impulsing springs 149, the cam 187 controls the associated contacts 137 to again apply ground potential to the conductors 102 and 103. The relay R1130X reoperates, in the manner previously described, and, at its contacts 1131X, applies ground potential to the conductor C1517XA. The ground potential applied to the conductor C1517XA is connected via the contacts 311 and 322 in order to operate the relay R326. During the time the cam 187 controls the associated contacts 137 to retain the ground potential on the line conductors 102 and 103, the dial controls the impulsing springs 149 to transmit the last switch controlling impulse by momentarily removing the ground potential from the line conductor 102. Accordingly, the line relay R1140X momentarily restores to normal in response to the last switch controlling impulse transmitted by the impulsing springs 149 and the party relay R1130X is retained in its operated position by the ground potential applied to the conductor 103. At its contacts 441, the line relay R1140X momentarily applies ground potential via the conductor C442A, the contacts 313, 328, 323 and 361 for operating the relay R365. As soon as the relay R1140X operates at the end of the last impulse transmitted by the impulsing springs 149, it removes ground potential from the conductor C442A in order to permit the relay R365 to lock itself in its operated position over a circuit including its contacts 366, the winding of the relay R360 and the grounded conductor C725X. The relay R360 operates in series with the relay R365. Shortly after the transmission of the last impulse by the impulsing springs 149, the cam 187 again controls the associated contacts 137 to remove ground potential from the line conductors 102 and 103 and thereby reestablish the previously described loop circuit including the impulsing springs 149, the two windings of the relay R1130X and the upper winding of the relay R1140X. The relay R1130X now restores to normal due to its differential action and the line relay R1140X is retained in its operated position. At its contacts 1131X, the relay R1130X now removes ground potential from the conductor C1517XA in order to permit the relay R326 to lock itself in its operated position in series with the relay R320, which also operates, to the grounded conductor C725X.

In view of the foregoing, it will be seen that at the end of the dialing of the first digit by the subscriber at station TS8, the calling party identifying relays R317, R310, R326, R320, R365 and R360 in the set 3000A are operated in the order named to register the fact that the eighth station TS8 on the eight party line originated the call. Assuming that no mutilation has occurred, the same relays in calling party identifying relay set 3000B will be operated at the end of the dialing of the second digit. When the above named relays in their operated positions, circuits will be completed from ground via contacts 315, 324, 333 and 367 in the relay set 3000A and in the relay set 3000B to the party 8 conductor and the contacts 8 of the relay R1910X for operating the party 8 relay as soon as the detector 1900 is associated with the call recorder 2000X by the operation of the relay R1910X. The operated condition of the party 8 relay controls the detector 1900X to identify the digits 1899 of the directory number assigned to station TS8 in the 1800 group.

*Conclusions*

In view of the above explanation describing the identification of the position of any calling station on an eight party line in response to two operations of the dial thereat, it will be appreciated that the alarm relay R240 in the detector 1900X may be controlled to render an indication of a failure to confirm the identity of a calling station on a party line. Further, it will be appreciated that the mode of confirming the identification of the calling party line stations, need not be dependent upon the loop impulses transmitted but may be wholly dependent upon the ground impulses transmitted by two dialings at the calling subscriber station. Additionally, it is understood that station identifying dialings need not be the first two or necessarily follow consecutively but may be arranged according to the convenience in equipment available.

While one embodiment of the invention has been disclosed in detail herein, it is understood that this embodiment is merely illustrative of the principles of the invention and that a person skilled in the art may devise many variations of the illustrative embodiment without departing from the true spirit and scope of the invention.

What is claimed is:

1. In an automatic telephone system, a party line, a plurality of stations on said party line, a calling device at each of said stations, the calling device at any calling one of said stations being selectively operable to transmit over said party line during a single operation thereof both a variable series of impulses and an individual station identifying signal, whereby the calling device at said stations transmit over said party line different station identifying signals incident to the operation thereof, switching apparatus, a first relay controlled by the impulses in each series of impulses transmitted in response to each operation of the calling device at a calling station for controlling said switching apparatus to extend said call from said calling station to a called station, a second relay controlled by said calling station identifying signal transmitted in response to each operation of said calling device at said calling station, first and second station registers, means controlled by said first relay and said second relay in response to at least two independent operations of said calling device for controlling said first register and said second register in the order named to register respectively the identity of said calling station, and alarm means operated only in response to the registration of different calling station identities in said first and second registers.

2. In an automatic telephone system, a party line, a plurality of stations on said party line, a calling device at each of said stations, the calling device at any calling one of said stations being selectively operable to transmit over said party line during a single operation thereof both a variable series of impulses and an individual station identifying signal, whereby the calling devices at said stations transmit over said party line different station identifying signals incident to the operation thereof, switching apparatus, a line relay controlled in response to the transmission over said party line of one or more variable series of impulses for controlling said switching apparatus to extend the call from the calling one of said stations, contact means, a party relay controlled in response to the transmission over said party line of said calling station identifying signal for operating said contact means, a plurality of station registers respectively corresponding to said stations on said party line, means responsive to one single operation of the calling device at the calling one of said stations for operating via said contact means the one of said station registers corresponding to the station identifying signal transmitted over said party line during said one single operation, means responsive to another single operation of the calling device at said calling one of said stations for operating via said contact means the one of said station registers corresponding to the station identifying signal transmitted over said party line during said another single operation, and means responsive to the operation of a plurality of station registers for indicating faulty identification of the calling station on said party line.

3. In an automatic telephone system, a party line, a plurality of stations on said party line, a calling device at each of said stations, the calling device at any calling one of said stations being selectively operable to transmit over said party line during a single operation thereof a minimum number of first type of impulses and a fixed number of second type of station identifying impulses, whereby the calling devices at the calling ones of said stations transmit over said party line respectively corresponding combinations of said first and second type of impulses, means responsive to one single operation of the calling device at any calling one of said stations on said party line for registering the identity of the station corresponding to the combination of first and second type impulses transmitted during said one single operation, means responsive to another single operation of the calling device at said one calling station on said party line for registering the identity of the station corresponding to the combination of first and second type impulses transmitted during said another single operation, and means responsive to the registration of the identity of more than one station during the initiation of a call from said one calling station for indicating faulty identification of said one calling station on said party line.

4. In an automatic telephone system, a party line, a plurality of stations on said party line, a calling device at each of said stations, the calling device at any calling one of said stations being selectively operable to transmit over said party line during a single operation thereof first type of impulses not less than predetermined number and a fixed number of second type of station identifying impulses, whereby the calling devices at the calling ones of said stations transmits over said party line respectively corresponding combinations of said first and second type of impulses, a first line relay controlled by said first type of impulses transmitted over said party line, a second line relay controlled by said second type of impulses transmitted over said party line, a first control circuit governed by said first line relay, a second control circuit governed by said second line relay, a first group of first relay registers and second relay registers, a second group of first relay registers and second relay registers, means responsive to one single operation of the calling device at any calling one of said stations for connecting said first control circuit to said first relay registers in said first group and for connecting said second control circuit to said second relay registers in said first group, thereby to operate said registers in said first group in accordance with the combination of said first type impulses and said second type impulses transmitted over said party line during said one single operation of said calling device, means responsive to a subsequent single operation of the calling device at said calling one of said stations for connecting said first control circuit to said first relay registers in said second group and for connecting said second control circuit to said second relay registers in said second group, thereby to operate said registers in said second group in accordance with the combination of said first type impulses and said second type impulses transmitted over said party line during said subsequent single operation of said calling device, a plurality of station registers respectively corresponding to said stations, means responsive to the operation of the first and second relay registers in said first group for operating a corresponding one of said station registers, means responsive to the operation of the first and second relay registers in said second group for operating a corresponding one of said station registers, and control means responsive to the operation of a plurality of said station registers during the initiation of a call from said one calling station for indicating faulty identification of said one calling station on said party line.

5. In the telephone system as recited in claim 4, wherein said second type of station identifying impulses transmitted during a single operation of a calling device at one of said stations are of a number respectively corresponding to said one station and wherein said second type of station identifying impulses occur during the period of said predetermined number of said first type of impulses.

6. In the telephone system as set forth in claim 4, wherein said second type of station identifying impulses transmitted during a single operation of a calling device at one of said stations are of a duration respectively corresponding to said station and wherein said second type of station identifying impulses occur during the period of said predetermined number of said first type of impulses.

7. In the telephone system as set forth in claim 4, wherein said second type of station identifying impulses transmitted during a single operation of a calling device at one of said stations are of a number and a duration respectively corresponding to said station and wherein said second type of station identifying impulses occur during the period of said predetermined number of said first type of impulses.

8. In an automatic telephone system, a party line, a plurality of stations on said party line, a calling device at each of said stations, the calling device at any calling one of said stations being selectively operable to transmit over said party line during a single operation thereof, first type of impulses not less than a predetermined number and a fixed number of second type of station identifying impulses, whereby the calling devices at the calling ones of said stations transmits over said party line respectively corresponding combinations of said first and second type of impulses, a first line relay controlled by said first type of impulses transmitted over said party line, a second line relay controlled by said second type of impulses transmitted over said party line, second registers selectively operable by said first line relay, second registers selectively operable by said first register circuit and said first line relay, a first group of first and second registers, and second group of first and second registers, means responsive to one single operation of the calling device at any calling one of said stations on said party line for operating said first registers in said first group in accordance with the operation of said second line relay and for operating said second registers in said first group in accordance with the operation of said first registers in said first group and said first line relay, means responsive to another single operation of the calling device at said calling one of said stations on said party line for operating said first registers in said second group in accordance with the operation of said second line relay and for operating said second registers in said second group in accordance with the operation of the first registers in said second group and said first line relay, a plurality of station registers respectively corresponding to said stations, means responsive to the operation of said first and second registers in said first group for operating a corresponding one of said station registers, means responsive to the operation of said first and second registers in said second group for operating a corresponding one of said station registers, and control means responsive to the operation of a plurality of said station registers during the initiation of a call from said one calling station for indicating faulty identification of said one calling station on said party line.

9. In an automatic telephone system, a party line including a first and a second conductor, a plurality of stations on said party line, a source of power supply for providing a reference potential at a first terminal and a low potential at a second terminal and a high potential at a third terminal, a first line relay having a first winding, a second line relay having a first and a second winding, said first and second windings being differentially wound with respect to one another, a first power connection via the first winding of said second relay from said second terminal to said first conductor, a second power connection via the first winding of said first relay and the second winding of said second relay from said third terminal to said second conductor, means at each of said stations responsive to the initiation of a call thereat for completing a circuit via said first and second power connections, whereby said first line relay is operated, a calling device at each of said stations, the calling device at a call initiating one of said stations being selectively operable during a single operation thereof to interrupt said completed circuit a variable number of times and to complete a connection between said first terminal and said first conductor a fixed number of times, so that said first line relay is restored in accordance with the interruptions of said completed circuit and said second line relay is operated via said second power connection in accordance with the completions of said first terminal and first conductor connections, a first group of first relay registers, a first group of second relay registers, a first group of contacts responsive to the operation of the second relay registers in said first group, a second group of first relay registers, a second group of second relay registers, a second group of contacts responsive to the operation of the second relay registers in said first group, a first relay switch having a first switch position and a second switch position, a second relay switch having a first switch position and a second switch position, means responsive to one single operation of the calling device at said calling station for operating said first and second relay switches into said first switch positions and responsive to a subsequent single operation of the calling device at said calling station for operating said first and second relay switches into said second switch positions, means responsive to the operation of said second line relay for selectively operating via said second relay switch during said one single operation of said calling device the second relay registers in said first group and for selectively operating via said second relay switch during said subsequent single operation of said calling device the second relay registers in said second group, means responsive to the operation of said first line relay for selectively operating during said one single operation of said calling device via said first relay switch and said first group of contacts the first relay registers in said first group and for selectively operating during said subsequent single operation of said calling device via said first relay switch and said second group of contacts the first relay registers in said second group, a plurality of station registers respectively corresponding to the stations on said party line, an alarm relay of the marginal operating type, means responsive to the operation of said first and second relay registers in said first group for completing via any one of said station registers and said alarm relay a circuit between said first and second terminals of said source to operate the one of said station registers corresponding to the one of said calling stations identified during said one single operation of said one calling device, means responsive to the operation of said first and second relay registers in said second group for completing via any one of said station registers and said alarm relay a circuit between said first and second terminals of said source to operate the one of said station registers corresponding to the one of said calling stations identified during said subsequent single operation of said one calling device, whereby responsive to the operation of more than one station registers during the initiation of a call at said one calling station said alarm relay is operated.

References Cited in the file of this patent

UNITED STATES PATENTS

| | | |
|---|---|---|
| 2,619,546 | Myers | Nov. 25, 1952 |
| 2,678,353 | Ostline | May 11, 1954 |
| 2,708,690 | Mitchell | May 17, 1955 |